June 24, 1958   W. R. WATSON   2,840,488
METHOD FOR ALUMINIZING CATHODE RAY TUBE SCREENS
Filed Nov. 16, 1955
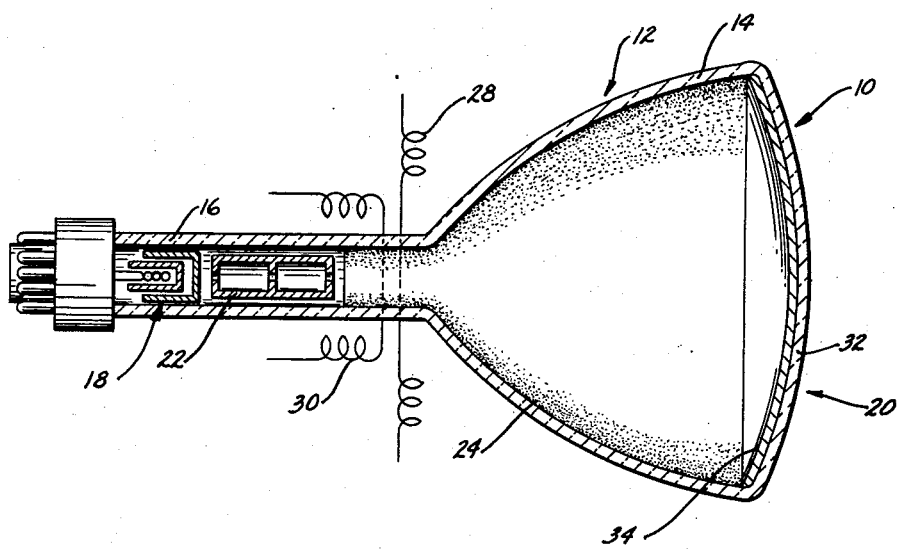
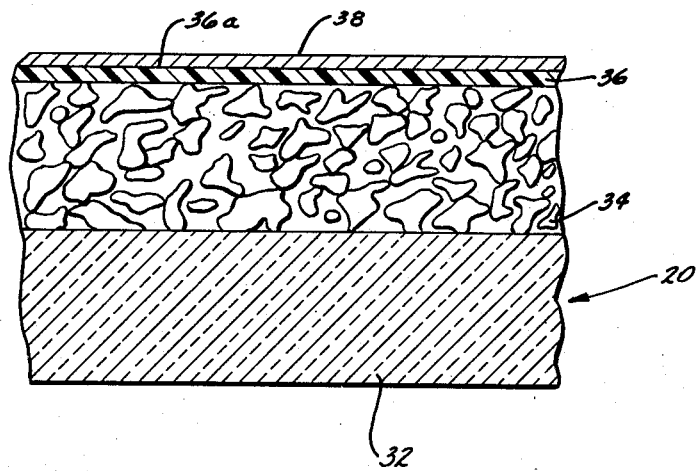
INVENTOR.
WILLIAM R. WATSON
BY Morton Amster
ATTORNEY

United States Patent Office 2,840,488
Patented June 24, 1958

2,840,488

METHOD FOR ALUMINIZING CATHODE RAY TUBE SCREENS

William R. Watson, Flushing, N. Y., assignor to Sylvania Electric Products Inc., a corporation of Massachusetts Application November 16, 1955, Serial No. 547,190

7 Claims. (Cl. 117—33.5)

The present invention relates to the manufacture of screens for cathode-ray tubes, and in particular to a method for the application of a metallic film or coating over the tube-side of the phosphor screen of a television picture tube.

In cathode-ray tubes for television receivers and like applications, it has been found advantageous to apply to the beam or tube-side of the phosphor screen, a thin, electron-pervious opaque metal film or backing. As is well understood, both the light output and resolution of the tube is materially increased by the presence of the metallic film. The metal film provides a highly reflective mirror like surface which tends to intensify the useful light directed toward the observer. Further it has been found that the metal film tends to absorb negative ion components of the scanning electron beam of the tube and prevents destructive bombardment of the picture tube screen. Still further, the tube may be operated efficiently at voltages above the sticking potential of the phophor as the metal film serves as the return path to the external circuit; that is, the screen will not have to depend upon its secondary emission characteristic to maintain the desired potential at the point of focusing.

Broadly, it is an object of the present invention to provide an improved method for producing metallized phophor screens for cathode-ray tubes.

The metal commonly used for backing of the phosphor screen is aluminum laid down by well understood vapor deposition techniques. To assure good reflection, it is essential that the metal film or backing be of mirror smoothness. In that the surface provided by the phosphor crystals making up the screen proper is irregular and rough, it has become the practice to lay down a transparent, thin lacquer film over the phosphor to provide a smooth foundation layer for the subsequent deposition of the metal coating. The function of the thin lacquer film is to provide a planar surface, the film stretching over the depressions in the phosphor screen. In accordance with the established procedures of the prior art, for example as detailed in U. S. Patent 2,644,770, the lacquer film is applied after wetting the phosphor screen with sufficient water to fill the interstices or pores of the screen. The amount of water covering the phosphor screen is selected to provide a flat surface upon which the lacquer film suspended in a suitable volatile solvent is spread. Upon evaporation of the solvent, the thin lacquer film is left behind on the water bed. The depth of the water level varies and is somewhat dependent on the curvature of the face plate of the picture tube. It is not uncommon to have water to a depth of approximately one inch at the shallowest point during laying down of the lacquer film. When the film is settled, the water is allowed to flow out from beneath the film, and the film drops into intimate contact with the phosphor screen. The film is then subjected to drying action, as by exposure to a current of warm air. The completed lacquer film stretches over the microscopic depressions and gaps in the phosphor screen and presents a hard substantially planar surface to which the reflecting metallic coating is then applied.

Difficulty arises with this method of applying the lacquer film in that stretching of the lacquer film results in regions where the film is membrane thin. In these thin stretched regions, it is not uncommon for the lacquer film to break through, thus causing the metallic film to penetrate below the lacquer film and encircle phosphor particles. Obviously the usefulness of the lacquer film is quite readily effected by the condition of the phosphor surface, and mechanical weakening, tearing, and localized regions of failure of the lacquer film are not uncommon. Accordingly, a considerable proportion of rejected tubes are encountered under actual production conditions.

It is a further object of the present invention to provide an improved method of applying a metallic film or layer to the tube-side of a phosphor screen which obviates one or more of the aforesaid difficulties. Specifically, it is within the contemplation of the present invention to achieve the application of the reflective metallic layer or film without the need for a water cushioning layer, yet in a manner providing a structurally adequate planar foundation for the deposition of a metallic film over the phosphor screen.

In accordance with an illustrative process demonstrating features of the present invention, the phosphor screen is initially settled from a solution containing a coagulant which will produce sufficient wet strength for the settled screen to allow for decantation of the excess liquid from the settling solution. After decanting the settling solution, the retained residual solution held back by the settled screen is treated by a coagulant whereby the retained residual solution sets up into a gel having a smooth planar surface. To this smooth planar surface, the conventional organic film in the form of a lacquer is applied to provide a flat-surfaced barrier or support for the reflective metallic coating.

The above brief description, as well as further objects, features and advantages of the present invention will be best appreciated by reference to the following description of a presently preferred process, when taken in conjunction with the accompanying drawings, wherein:

Fig. 1 is a schematic drawing of a typical cathode-ray tube of conventional design to which the present invention has application; and Fig. 2 is an enlarged section of the screen of said tube.

Referring now specifically to the drawings, there is shown in Fig. 1 a cathode-ray tube, generally designated by the reference numeral 10, suitable for use in a conventional television receiver. The tube includes an envelope 12 consisting of an enlarged bulb or body section 14 and an elongated slender neck section 16. Arranged within the neck section 16 is an electron gun, generally designated by the reference numeral 18, for directing a beam of electrons axially of the neck or sleeve section 16 toward the face or target 20 of the envelope 12. Concentric of the beam path is a first control electrode 22 maintained at a positive potential with respect to the cathode of the electron gun by a suitable bias source. A second control electrode 24 is provided by a conductive coating which is applied to the inner surface of the envelope or bulb 12, by tehcniques well understood per se. The described gun arrangement provides a focused and accelerated stream of electrons which are directed to and impinge upon the screen 20, the beam being scanned by appropriate electro-magnetic or electrostatic deflecting means, such as the scanning coils 28, 30. The illustrative cathode-ray tube is subject to a latitude of variation in its construction and manufacture as is well understood, per se.

As seen best in Fig. 2 the screen 20 of the envelope 12 includes a glass face plate or base 32 integral with the bulb, a phosphor screen 34 coextensive with the glass face plate, a hardened lacquer film 36 covering the rough-surfaced phosphor layer or film 34 having a substantially planar outer surface 36a, and a metallic film or coating 38 bonded to the planar surface 36a of the lacquer film 36.

In accordance with the present invention to any one of the conventional screen settling solutions containing appropriate phosphors, potassium silicate and other known ingredients, there is added a quantity of a coagulant which will produce sufficient wet strength for the settled screen to permit decantation of the excess liquid. A typical settling solution or medium contains the following ingredients, in parts by weight:

| | Parts by weight |
|---|---|
| Potassium oxide ($K_2O$) | 13 |
| Acetic acid ($CH_3COOH$) | 15 |
| Silica ($SiO_2$) | 29 |
| Water ($H_2O$) | 2900 |

The above typical settling solution is based upon an analytical determination or chemical analysis. The several chemicals or ingredients are commercially available in various proportions by weight as standard potassium waterglass formulations.

The coagulation may be achieved by a number of different mechanisms including the action of hydrogen ions from volatile acids such as acetic acid, hydrochloric acid and nitric acid, or by the action of water soluble organic materials such as alcohol or acetone.

Upon decantation of the excess liquid, a quantity of residual liquid will be held back by the settled screen. The residual or retained settling solution is treated with the vapors from an appropriate coagulant, preferably a volatile material, such as acetic acid or acetone so that the retained or residual solution sets to form a gel presenting a smooth and continuous planar surface for the deposition thereon of the laquer film or barrier 36. The coagulation of the residual liquid may be achieved with conventional apparatus. For example, the envelope 10 may be placed in a spray chuck, a spray gun extended into the neck of the envelope 12, and the desired coagulant sprayed onto the phosphor layer or screen 32.

The establishment of the smoothed surface gel serves the important function of filling up the pores or spaces between the phosphor particles providing a continuous surface 36a for the subsequent formation thereon of the metal layer 38.

The lacquer film 36 is then formed directly on the settled phosphor screen. For example, the lacquer may be sprayed onto the screen while rotating the bulb body 12 about its axis in a centrifugal chuck to spread the lacquer material uniformly about the surface of the screen 20. The lacquer film may be formed of any appropriate material such as resins or plastics which readily dissolve in volatile solvents. Such resins or plastics include nitro-cellulose, cellulose acetate, and polystyrene. A latitude of variation in the manner of applying the lacquer film and its ingredients is intended in accordance with the teachings of the prior art.

As the solvent evaporates, the lacquer film hardens leaving a thin stretched lacquer film or substantially uniform thickness over a firm footing or base provided by the settled screen proper. After the film is hardened, the metal screen or layer 38 is applied, for example by vaporization of aluminum. In that the manner of applying the metal screen 38 is well understood per se, further description is dispensed with.

The cathode-ray tube 10 may thereafter be completed in the usual fashion, including baking out to remove the lacquer film and volatile residues.

From the foregoing description it will be appreciated that numerous practical advantages are realized by metallizing phosphor screens in accordance with the present invention. By the present techniques, it is possible to obtain uniform lacquer films which do not have overly stretched or weakened areas, presenting a possible risk of failure of the lacquer film and consequent discontinuity in the metal screen. The lacquer film itself has better support in that it is uniformly in contact with the underlying settled screen, as contrasted to lacquered films deposited by prior art which are mainly supported by the peaks of the phosphor particles of the screen.

Further processing of the screens is materially simplified, especially as contrasted to the known method of floating a lacquer layer onto a phosphor screen covered with water followed by transfer of the lacquer film to the peaks of the phosphor surface by decanting the underlying water. Still further, processing time is materially shortened and greater reliability in the formation of smooth, continuous and highly reflective metal films is assured.

Numerous modifications are intended from the foregoing disclosure and accordingly the appended claims should be construed broadly and as is consistent with the disclosure herein; in some instances some features of the invention will be used without a corresponding use of other features.

What I claim is:

1. In the manufacture of a cathode-ray tube, the steps including settling a phosphor screen from a silicate settling solution containing a coagulant onto the screen-forming surface of the cathode-ray tube, decanting the settling solution, treating the retained residual solution held back by said screen with the vapors of a coagulant to cause the retained residual solution to set in a gel having a smooth surface, applying an organic film-forming material in a volatile solvent onto said smooth surface to provide a barrier film, hardening said barrier film to present a smooth planar surface over said phosphor screen, and applying a reflecting metallic coating on said smooth planar film.

2. In the manufacture of a cathode-ray tube, the steps including settling a phosphor screen from a settling solution containing a coagulant onto the screen-forming surface of the cathode-ray tube, decanting the settling solution, treating the retained residual solution held back by said screen with the vapors of a coagulant to cause the retained residual solution to set in a gel having a smooth surface, applying an organic film-forming material onto said smooth surface in a barrier film, hardening said barrier film to present a smooth planar surface over said phosphor screen, and applying a reflecting metallic coating on said smooth planar film.

3. In the manufacture of a cathode-ray tube, the steps including settling a phosphor screen from a settling solution containing a coagulant onto the screen-forming surface of the cathode-ray tube, decanting the settling solution, and treating the retained residual solution held back by said screen with the vapors of a coagulant to cause the retained residual solution to set in a gel having a smooth surface.

4. The method of applying a metallic reflecting coating to a fluorescent screen of a cathode-ray tube including the steps of initially settling said screen from a liquid-settling medium containing a coagulant producing sufficient wet strength of the settled screen to allow for decantation of excess liquid, decanting said liquid-settling solution to remove excess liquid, coagulating the residual liquid held back by said screen to form a gel having a smooth surface, applying an organic film-forming material onto said fluorescent screen, drying the organic film to form a smooth organic coating over said fluorescent screen, and applying a metallic reflecting coating onto said smooth organic coating.

5. The method of applying a metallic reflecting coating to a screen of a cathode-ray tube including the steps of initially settling said screen from a liquid-settling medium containing a coagulant producing sufficient wet strength of the settled screen to allow for decantation of excess liquid, decanting said liquid settling solution to remove excess liquid, treating the residual liquid held back by said screen with vapors of a coagulant to form a gel having a smooth surface, applying an organic film-forming material onto said screen to form a smooth organic coating over said screen, and applying a metallic reflecting coating onto said smooth organic coating.

6. In the manufacture of a television picture tube having a screen-forming surface, the steps including settling a phosphor screen from a settling solution onto said screen-forming surface, decanting the settling solution to remove excess liquid of said settling solution, treating the retained residual solution held back by the settled phosphor screen with a coagulant to cause the retained residual solution to set in a gel having a smooth surface, and thereafter applying an organic film-forming material onto said smooth surface to provide a barrier film.

7. In the manufacture of a television picture tube having a screen-forming surface, the steps including settling a phosphor screen from a settling solution onto said screen-forming surface, decanting the settling solution to remove excess liquid of said settling solution, treating the retained residual solution held back by the settled phosphor screen with a coagulant to cause the retained residual solution to set in a gel having a smooth surface, applying an organic film-forming material onto said smooth surface to provide a barrier film, hardening said barrier film to present a smooth planar surface over the settled phosphor screen, and applying a reflecting metallic coating on said smooth planar film.

References Cited in the file of this patent

UNITED STATES PATENTS

| | | |
|---|---|---|
| 2,621,134 | Welch | Dec. 9, 1952 |
| 2,644,770 | Sadowsky | July 7, 1953 |
| 2,733,163 | Steadman | Jan. 31, 1956 |